United States Patent [19]

Terrier et al.

[11] Patent Number: 6,118,431
[45] Date of Patent: Sep. 12, 2000

[54] ADAPTABLE DETACHABLE CASING FOR A MOUSE TYPE PERIPHERAL FOR A COMPUTER

[75] Inventors: Alain Terrier, Saint Cheron; Xavier Rodet, Paris, both of France

[73] Assignee: France Telecom, Paris, France

[21] Appl. No.: 08/982,717

[22] Filed: Dec. 2, 1997

[30] Foreign Application Priority Data

Dec. 2, 1996 [FR] France .................................. 96 14759

[51] Int. Cl.⁷ ...................................... G09G 5/08
[52] U.S. Cl. ............................ 345/163; 345/158
[58] Field of Search ...................... 345/163, 164, 345/165, 166, 167, 158; 248/118.5, 918; 463/37

[56] References Cited

U.S. PATENT DOCUMENTS

| | | | |
|---|---|---|---|
| 5,095,302 | 3/1992 | McLean et al. | 345/164 |
| 5,340,067 | 8/1994 | Martin et al. | 248/118.5 |
| 5,579,033 | 11/1996 | Rutledge et al. | 345/161 |
| 5,731,807 | 3/1998 | Feierbach | 345/163 |
| 5,851,623 | 12/1998 | Tarulli et al. | 428/68 |

FOREIGN PATENT DOCUMENTS

| | | |
|---|---|---|
| 0 346 859 | 12/1989 | European Pat. Off. . |
| 2733069 | 10/1996 | France . |

OTHER PUBLICATIONS

Research Disclosure, No. 342, Oct., 1992, *Depth/Force Capability for Mouse Pointing Devices*.

*Primary Examiner*—Steven J. Saras
*Assistant Examiner*—William C. Spencer
*Attorney, Agent, or Firm*—Nilles & Nilles SC

[57] ABSTRACT

A is a detachable casing capable of adapting to a computer mouse type peripheral by covering it partially. This casing comprises, firstly, at least one pressure sensor to measure the pressure exerted on this pressure sensor by an operator's hand and, secondly, linking means to address the signals coming from this sensor to the computer. The casing is inexpensive and highly ergonomical. It enables the possibilities of use of a computer to be greatly extended by increasing the number of controls performed with only one hand.

7 Claims, 2 Drawing Sheets

ADAPTABLE DETACHABLE CASING FOR A MOUSE TYPE PERIPHERAL FOR A COMPUTER

BACKGROUND OF THE INVENTION

1. Field of the Invention

The present invention relates to a detachable casing that can be adapted to a mouse type peripheral for a computer. This casing comprises input commands designed to be added to the commands of a standard computer peripheral and to control the representation of a third dimension on a computer screen.

2. Description of the Prior Art

Many devices capable of simulating a third dimension have already been devised. Thus, initially, devices distinct from computer peripherals comprising one or more pressure sensors were made. These devices are described especially in the patent application EP-A-0 330 270 and take the form of pedals that can be activated by foot or packs that can be activated by hand. The pressure sensors react to the pressure of the foot or to a user's fingers and convey information in a third dimension to a computer. Such devices are used only to control the representation of an effect of perspective; they do not affect the representation of the first and second dimensions. Their use therefore necessarily implies the concomitant handling of a standard peripheral for computers. Now, since the two distinct devices cannot be handled by only one hand, it becomes difficult to simultaneously activate several input commands. Consequently, these devices are not ergonomical.

To overcome this ergonomical problem, one solution consists in adding pressure sensors, capable of reacting to the pressure of an operator's fingers or hand, directly to computer mouse type peripherals. These peripherals can therefore be used both to plot a line in two dimensions using standard x-axis and y-axis positioning commands and to simulate a third dimension by obtaining a variation in the thickness of the line by means of the pressure sensors. Such computer peripherals are described especially in the French patent application FR 95 044015, the patent application WO-A-88 8565 and in an article entitled "Depth/Force Capability for Mouse Painting Devices" in the journal Research Disclosure No. 342, October 1992, page 769. These devices however require a conversion of the standard peripheral, which therefore leads to a considerable increase in its manufacturing cost.

SUMMARY OF THE INVENTION

The present invention makes it possible to overcome the drawbacks that have just been described since it proposes a device that is both ergonomical and costs little, enabling the control of the representation of an effect of perspective on a computer screen. The invention relates more particularly to a detachable casing designed to be adapted to a computer mouse type peripheral by covering it partially and comprising, firstly, at least one pressure sensor to measure the pressure exerted on this pressure sensor by an operator's hand and, secondly, linking means to address the signals coming from this sensor to the computer.

According to another characteristic of the casing according to the invention, the sensor or sensors are located at a place or places where the sensor or sensors can receive pressure exerted by the operator's fingers or hand. Preferably, the sensor or sensors are positioned on a lateral face of the casing so as to enable action on the sensor with the thumb and/or behind the upper face of the casing so as to enable action on the sensor with the palm of the hand.

According to another characteristic, the lower face of the casing is hollowed out and provided, on its rim, with slideways capable of guiding the mouse during its insertion and of maintaining it within the casing after its insertion.

According to another characteristic, the casing is molded, cast or else thermoformed out of an elastic material with shape memory capable of gripping the mouse. Preferably, this elastic material with shape memory is constituted by polyester, Kevlar or carbon fibers. Of course this example is not exhaustive and other materials meet the same criteria.

According to another characteristic, the means for linking the pressure sensor to the computer are capable of providing for digital transmission.

The casing according to the invention is a low-cost unit. It is highly ergonomical and enables simple manipulation, with only one hand, of the input controls.

BRIEF DESCRIPTION OF THE DRAWINGS

Other particular features and advantages of the invention shall appear clearly from the following description given by way of a non-restrictive example with reference to the appended figures, of which.

MORE DETAILED DESCRIPTION

Figure 1:
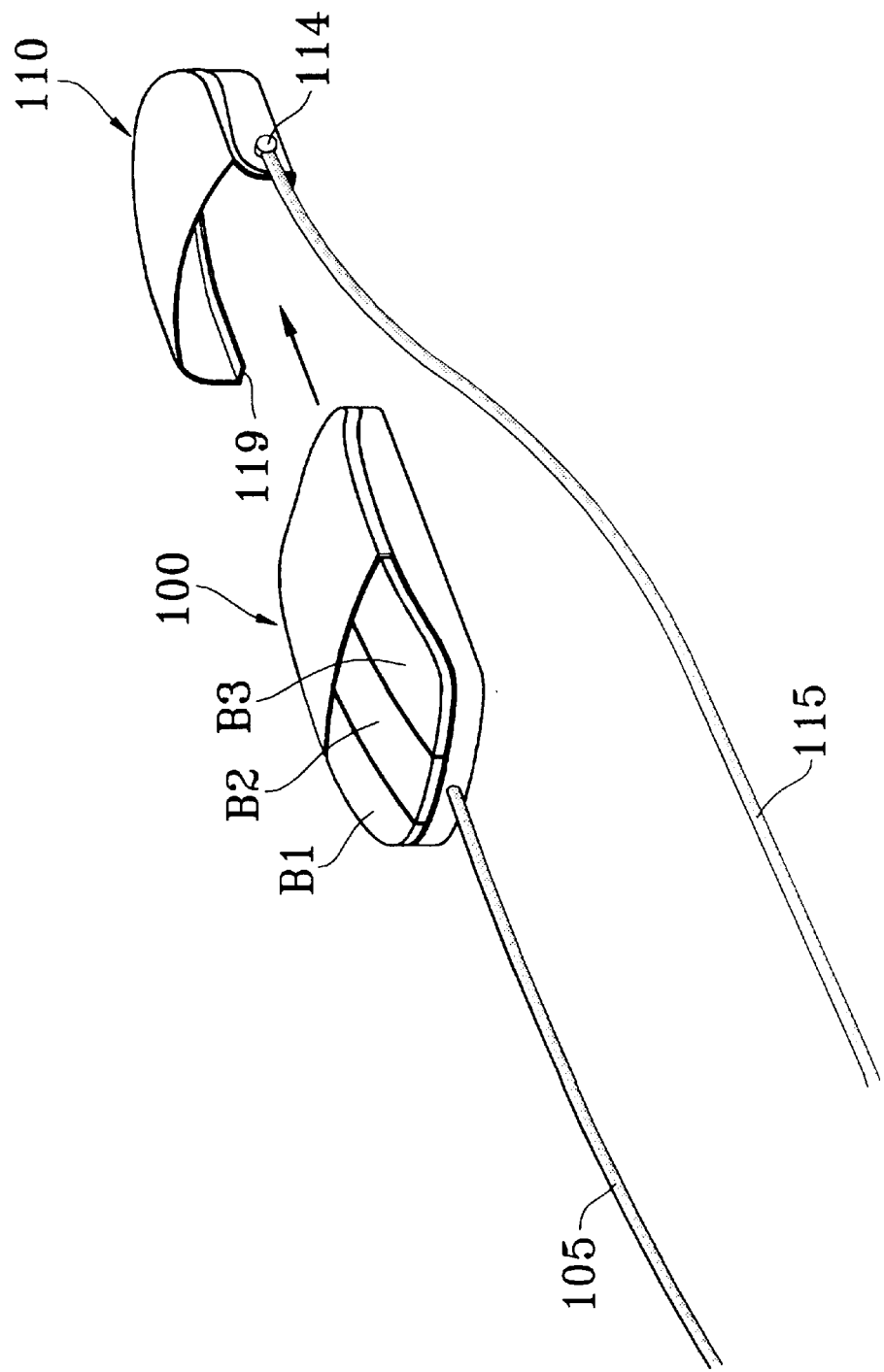
FIG. 1 shows a view in perspective of a casing according to the invention and a computer mouse.

A computer mouse is designated by the general reference 100 in FIG. 1. The mouse 100 is a standard type of mouse. It comprises, firstly, on its lower face, a position or shifting sensor and, secondly, on its upper face, three buttons B1, B2, B3. The position sensor, which cannot be seen in FIG. 1, is used to determine the x-axis and y-axis motions of the mouse. It generally takes the form of a ball. The buttons B1, B2, B3 make it possible, in a standard manner, to send binary information to the computer to which the mouse is connected, depending on whether these buttons are depressed or released. The signals coming from the position sensor and the buttons B1, B2, B3 are multiplexed and transmitted to the computer by a standard series line 105.

A casing according to the invention, capable of being adapted to the mouse 100, is furthermore designated by the reference 110 in FIG. 1. This casing 110 takes the form of a shell into which the mouse 100 gets nested following the direction shown by the arrow in FIG. 1. Its lower face is hollowed out so as not to hamper the position sensor of the mouse. However, this lower face is provided, throughout its rim, with slideways 119 that can be used not only to guide the mouse 100 when it is inserted but also to keep the mouse within the casing after it has been inserted.

Advantageously, the casing 110 takes a form such that it can cover only a part of the mouse 100. Indeed, it covers approximately the rear two-thirds of the mouse 100. In this way, the buttons B1, B2, B3 of the mouse 100 are always accessible to the operator.

The casing furthermore has one or more pressure sensors. In FIG. 1, only one pressure sensor is shown and is designated by the reference 114. This senor is used to determine the pressure that is applied to it by the operator's finger or hand and, in response to this pressure, to transmit an analog information element giving a measurement of said pressure. This information is then digitized and then transmitted to the computer, to which the casing 110 is connected, by means of a cable 115.

This transmission system consists in having as many separate connection lines as there are pressure sensors in the cable 115 and in connecting these lines to as many input ports of the computer as there are lines. Indeed, it is known that there are extension cards adaptable to the computers, for example PC type computers, and that these cards can be used to memorize digitized information applied to their inputs to transmit them to the data bus of the computer.

The pressure sensors may be placed somewhat everywhere on the body of the casing 110 so that they respond to variations in pressure exerted by the fingers or possibly by other parts of the hand, such as the palm for example, which takes the unit formed by the casing adapted to the mouse.

In view of the way in which a mouse is generally held, the simplest position in which one of these sensors can be placed consists in placing it on the left lateral face of the casing 110, as shown in FIG. 1, so that action can be taken on the sensor with the thumb. Naturally, for left-handed people, the sensor will preferably be positioned on the right lateral face. All other positions are possible but of course they are practical to use in varying degrees. We might refer for example to the position in the rear of the upper face of the casing for which the sensor reacts to the pressure exerted by the palm of the operator's hand.

The casing 110 is preferably made out of plastic. It is furthermore subjected to slight prestressing, during manufacture, so that it can efficiently hold the mouse 100.

Advantageously, the casing is furthermore molded, cast or else thermoformed out of an elastic material with shape memory capable of matching the shape of the mouse 100 and of gripping it to improve the way in which it is held. Thus, when the operator inserts the mouse into the casing 110, the elastic material expands to let through a first slightly curved part of the upper face of the mouse. Then it again tightens again to grip a second more thinned-out part of this same face. In this way the elastic material efficiently holds the mouse within the casing. Furthermore, when the operator removes the mouse from the casing 110, the elastic material retrieves its initial shape.

The elastic material with a shape memory is preferably constituted by polyester, Kevlar or carbon fibers.

Figure 2:
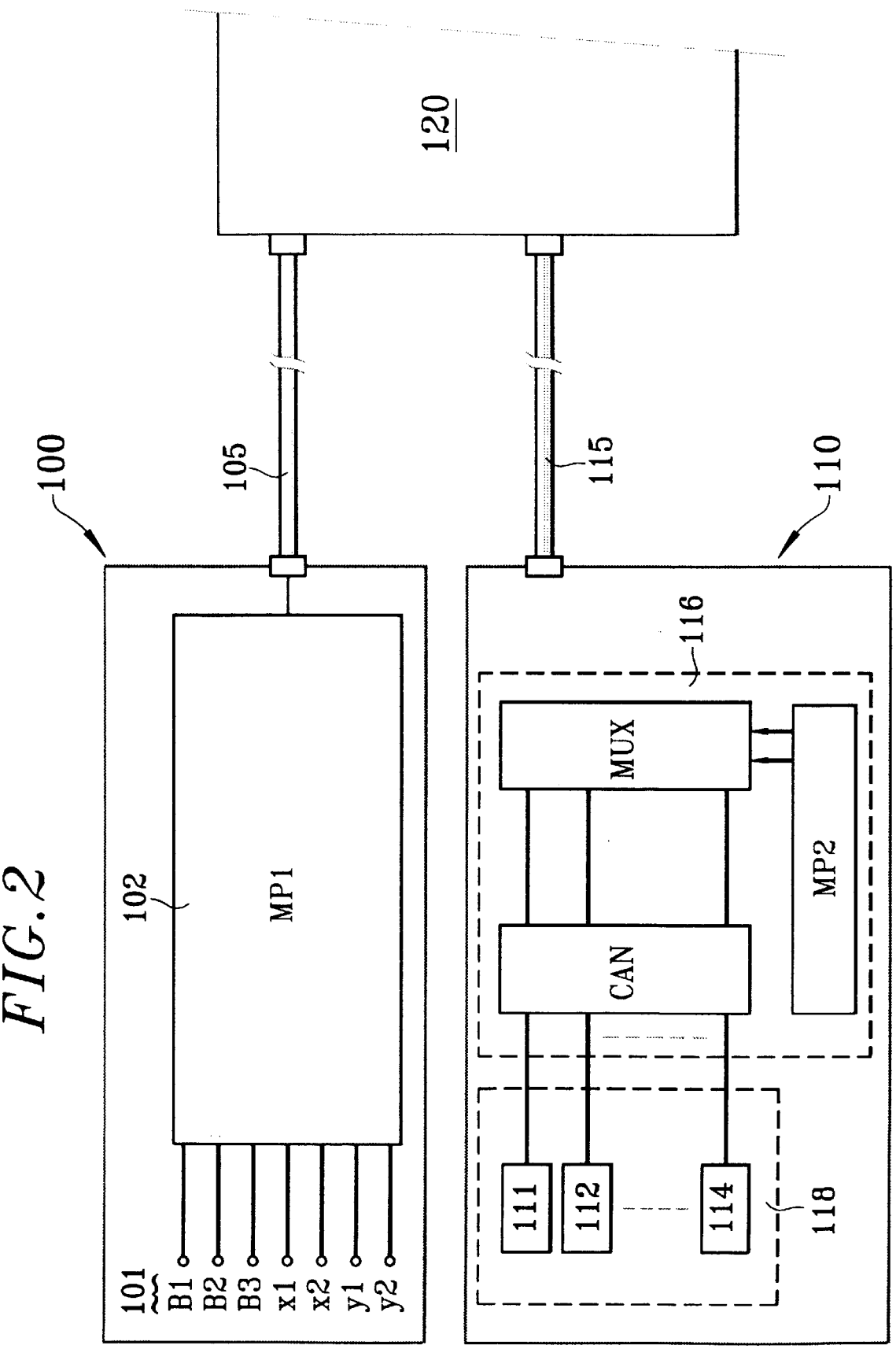
FIG. 2 shows a drawing of an exemplary embodiment.

In FIG. 2, the set of information elements 101 from the mouse 100, both x-axis and y-axis information (from the position sensor or shifting sensor) and binary information (from the contact buttons B1 to B3) are multiplexed in a processing circuit 102 (of a known type of mouse control microprocessor) which transmits these information elements by means of a cable 105 to the computer 120, preferably by the series input of this computer. It will be recalled that the series input of a computer, also known as the standardized RS2332C input, enables asynchronous communication in which binary words are transmitted and enables the encoding of the information elements as a function of the number of bits used for these words and the code chosen. The communication may be fairly swift to enable the time multiplexing successively of the x-axis and y-axis information elements and action on the buttons.

The detachable casing 110 for its part, which is adaptable to the mouse 100, comprises electronic circuits 116 comprising an analog-digital converter CAN, a multiplexer MUX and a microprocessor MP2 to guide the multiplexer. These circuits enable the direct digitizing of the analog signals coming from the set 118 of the pressure sensors 111, 112, . . . , 114, and then the multiplexing of these signals and their transmission to the computer 120 by a serial line 115 which is distinct from the line 105 linking the mouse 100 to the computer.

The use of these two connection lines, namely the line 105 for the standard information elements coming from the mouse 100 and the line 115 for the pressure information elements coming from the pressure sensor or from sensors positioned on the casing 110, makes it possible very particularly to continue employing the usual mouse control software in the ordinary functions of the mouse and to use a specific control software to process information elements coming from the pressure sensors placed on the casing 110.

The digitization and multiplexing of the analog signals obtained from the pressure sensors could be done for example by means of a MICROCHIP PIC16C71 type controller which, inter alia, enables the digitizing of four analog outputs, the multiplexing of the digital signals obtained and their transmission in a serial type or "MIDI" type format.

Depending on the number of sensors added and depending on their location, a casing according to the invention will enable the entry, into the computer, of information that could be used by an appropriate software, for example so as to depict a large number of different figures.

In a first exemplary use, it is possible to use this information to simulate the action of a brush, as in the case of a painting, or a chisel as in the case of a sculpture.

In the case of a painting for example the shifting of the mouse would make it possible in a usual way to shift the cursor simulating the brush. A pressure on a lateral sensor of the casing 110, adapted to the mouse 100, enables modification of the width of the brush and pressure on another sensor enables modification of the color used.

In the case of a sculpture for example, pressure on a lateral sensor of the casing 110 will make it possible to determine the position in depth, simulated of course by the perspective on the screen, of the chisel being used to sculpt the sculpture and pressure on another sensor will determine the quantity of material removed at this place to obtain the sculpture. As the case may be, since it is a simulation, it is possible also no longer to remove material but to add it.

Furthermore, in the field of sound, it is possible to make a computer-simulated model of a violin play by using the x-axis and y-axis variables coming from the position sensor of the mouse to determine the position of the bow on the one hand in its perpendicular movement on the string and secondly in its position at a varying distance from the bridge. In this case, two other measurements of pressure, made by means of the pressure sensors of the casing 110 according to the invention, would make it possible to control, firstly, the pressure of the bow on the string and, secondly, the hair width used to approach this string.

The casing according to the invention therefore makes it possible, by increasing the number of controls performed through an operator's hand, to considerably extend the possibilities of use of a computer. It is furthermore an inexpensive and highly ergonomical device since it can be adapted to a standard computer mouse.

What is claimed is:

1. A detachable casing designed to be adapted to a computer mouse type peripheral by covering it partially and comprising, firstly, at least one pressure sensor integrated as part of the detachable casing to measure the pressure exerted on this pressure sensor by an operator's hand and, secondly, linking means to address the signals coming from this sensor to the computer.

2. A casing according to claim 1, wherein the pressure sensor or sensors are located at a place or at places where said pressure sensor or sensors can receive pressure exerted by the operator's fingers or hand.

3. A casing according to claim 2, wherein the pressure sensor or sensors are positioned on a lateral face of the casing so as to enable action on the sensor with the thumb and/or behind the upper face of the casing so as to enable action on the sensor with the palm of the hand.

4. A casing according to claim 1, wherein its lower face is hollowed out and provided, on its rim, with slideways capable of guiding the mouse during its insertion and of maintaining it within the casing after its insertion.

5. A casing according to claim 1, that is molded, cast or else thermoformed out of an elastic material with shape memory capable of gripping the mouse.

6. A casing according to claim 5, wherein the elastic material with shape memory is constituted by polyester fibers.

7. A casing according to claims 1, wherein the means for linking the pressure sensor to the computer are capable of providing for digital transmission.

* * * * *